US008593329B2

(12) United States Patent
Mohamadi et al.

(10) Patent No.: US 8,593,329 B2
(45) Date of Patent: Nov. 26, 2013

(54) HAND-HELD SEE-THROUGH-THE-WALL IMAGING AND UNEXPLODED ORDNANCE (UXO) DETECTION SYSTEM

(75) Inventors: Farrokh Mohamadi, Irvine, CA (US); David Sharbaugh, Newport Beach, CA (US)

(73) Assignee: Tialinx, Inc., Irvine, CA (US)

( * ) Notice: Subject to any disclaimer, the term of this patent is extended or adjusted under 35 U.S.C. 154(b) by 314 days.

(21) Appl. No.: 12/983,229

(22) Filed: Dec. 31, 2010

(65) Prior Publication Data

US 2011/0227778 A1    Sep. 22, 2011

Related U.S. Application Data (60) Provisional application No. 61/314,976, filed on Mar. 17, 2010.

(51) Int. Cl.
*G01S 13/00* (2006.01)
*H01Q 19/10* (2006.01)
*H01Q 3/12* (2006.01)
*H01Q 1/42* (2006.01)
*H02B 1/00* (2006.01)

(52) U.S. Cl.
USPC ............. 342/22; 343/755; 343/761; 343/872; 361/600

(58) Field of Classification Search
USPC ................ 342/22; 343/755, 757, 761, 781 R, 343/832–840, 872, 892; 74/543–551, 74/551.1, 551.2, 551.3, 551.4, 551.5, 74/551.6, 551.7, 551.8, 55, 1.9; 16/110.1, 16/426, 429, 430; 361/142, 600, 679.01, 361/679.02, 679.03, 679.19, 679.55, 361/679.56, 67, 9.59
See application file for complete search history.

(56) References Cited

U.S. PATENT DOCUMENTS

| | | | | |
|---|---|---|---|---|
| 2,855,257 A * | 10/1958 | Barker et al. | ................... | 312/7.1 |
| 2,855,521 A * | 10/1958 | Blackstone | ................... | 250/347 |
| 3,277,472 A * | 10/1966 | Gelpi et al. | ................... | 342/178 |
| 3,733,133 A * | 5/1973 | Chapman | ................... | 356/141.4 |
| 3,793,634 A * | 2/1974 | Heller et al. | ................... | 342/80 |
| 4,041,500 A * | 8/1977 | Lapp | ............................. | 343/761 |
| 4,121,498 A * | 10/1978 | Williams et al. | ................ | 91/186 |
| 4,293,859 A * | 10/1981 | Sergent | ......................... | 343/702 |
| 4,644,365 A * | 2/1987 | Horning | ......................... | 343/882 |
| 4,665,401 A * | 5/1987 | Garrard et al. | ................... | 342/75 |
| 4,866,456 A * | 9/1989 | Ebey | ............................. | 343/766 |
| 4,944,541 A * | 7/1990 | Waldschmidt | ................... | 294/58 |
| 5,019,833 A * | 5/1991 | Nonaka | ......................... | 343/840 |

(Continued)

*Primary Examiner* — Jack W Keith
*Assistant Examiner* — Peter Bythrow
(74) *Attorney, Agent, or Firm* — Haynes and Boone, LLP (57) ABSTRACT

The housing of a portable radar unit includes features for providing positioning of auxiliary handles between a first position and a second position, in which: the first position places the auxiliary handles in a position to act as handgrips in conjunction with integral handles and the second position places the auxiliary handles at an angle to the integral handles, so that the radar unit can be held with one hand and supported by a forearm of the same hand. Rotation of each auxiliary handle about a pivot moves the auxiliary handle between the first position and the second position; and a friction mechanism resists the rotation so that the auxiliary handle tends to stay in position until purposefully moved. The housing also includes internal space for housing a radar antenna, a reflector, and a mechanism for adjusting distance between the reflector and the antenna for tuning performance of the antenna. The housing provides external access without intrusion into the housing for operating the adjusting mechanism.

13 Claims, 5 Drawing Sheets

(56) References Cited

U.S. PATENT DOCUMENTS

| | | | |
|---|---|---|---|
| 5,145,137 A * | 9/1992 | Choi | 248/288.51 |
| 5,444,568 A * | 8/1995 | Williams et al. | 359/400 |
| 5,552,957 A * | 9/1996 | Brown et al. | 361/679.41 |
| 5,657,031 A * | 8/1997 | Anderson et al. | 343/757 |
| 5,673,057 A * | 9/1997 | Toland et al. | 343/761 |
| 5,680,048 A * | 10/1997 | Wollny | 324/329 |
| 5,717,567 A * | 2/1998 | Tao | 361/679.45 |
| 5,864,481 A * | 1/1999 | Gross et al. | 700/90 |
| 5,886,664 A * | 3/1999 | Yujiri et al. | 342/351 |
| 6,031,502 A * | 2/2000 | Ramanujam et al. | 343/761 |
| 6,097,190 A * | 8/2000 | Foerster | 324/329 |
| 6,111,553 A * | 8/2000 | Steenbuck | 343/891 |
| 6,359,582 B1 * | 3/2002 | MacAleese et al. | 342/22 |
| 6,404,399 B1 * | 6/2002 | Morita | 343/761 |
| 6,417,797 B1 * | 7/2002 | Cousins et al. | 342/179 |
| 6,445,334 B1 * | 9/2002 | Bradley et al. | 342/22 |
| 6,462,696 B1 * | 10/2002 | Gorman | 342/22 |
| 6,466,175 B1 * | 10/2002 | Ehrenberg et al. | 343/761 |
| 6,597,568 B2 * | 7/2003 | Ryder | 361/679.55 |
| 6,617,996 B2 * | 9/2003 | Johansson et al. | 342/22 |
| 6,630,912 B2 * | 10/2003 | Ehrenberg et al. | 343/882 |
| 6,657,577 B1 * | 12/2003 | Gregersen et al. | 342/22 |
| 6,819,109 B2 * | 11/2004 | Sowers et al. | 324/329 |
| 6,911,823 B2 * | 6/2005 | Rowan | 324/326 |
| 6,919,852 B2 * | 7/2005 | Desargant et al. | 343/766 |
| 6,937,352 B1 * | 8/2005 | Scow et al. | 356/630 |
| D512,656 S * | 12/2005 | Yeung | D10/47 |
| 7,212,014 B2 * | 5/2007 | Krantz | 324/661 |
| 7,265,551 B2 * | 9/2007 | Kellermann | 324/326 |
| 7,310,060 B2 * | 12/2007 | Stilwell et al. | 342/22 |
| 7,310,586 B2 * | 12/2007 | Stamatescu et al. | 702/107 |
| 7,345,618 B1 * | 3/2008 | Cole et al. | 342/22 |
| 7,362,260 B2 * | 4/2008 | Cloutier et al. | 342/127 |
| 7,482,968 B2 * | 1/2009 | Wuersch et al. | 342/22 |
| 7,518,374 B1 * | 4/2009 | Olsson et al. | 324/326 |
| 7,525,507 B1 * | 4/2009 | Henry, Jr. | 343/882 |
| 7,532,127 B2 * | 5/2009 | Holman et al. | 340/686.1 |
| 7,535,407 B2 * | 5/2009 | Cloutier et al. | 342/127 |
| 7,557,559 B1 * | 7/2009 | Olsson et al. | 324/67 |
| 7,561,113 B2 * | 7/2009 | Lenk | 343/772 |
| 7,576,701 B2 * | 8/2009 | McGrath et al. | 343/754 |
| 7,626,400 B2 * | 12/2009 | Holbrook et al. | 324/642 |
| 7,679,546 B2 * | 3/2010 | Bublitz et al. | 342/22 |
| 7,683,845 B2 * | 3/2010 | Wynn | 343/757 |
| 7,834,801 B2 * | 11/2010 | Waite et al. | 342/22 |
| 7,999,722 B2 * | 8/2011 | Beeri et al. | 342/22 |
| 8,106,660 B1 * | 1/2012 | Merewether et al. | 324/326 |
| 8,253,619 B2 * | 8/2012 | Holbrook et al. | 342/22 |
| 2002/0027767 A1 * | 3/2002 | Ryder | 361/683 |
| 2003/0043067 A1 * | 3/2003 | Johansson et al. | 342/22 |
| 2006/0055584 A1 * | 3/2006 | Waite et al. | 342/22 |
| 2006/0061504 A1 * | 3/2006 | Leach et al. | 342/22 |
| 2006/0091888 A1 * | 5/2006 | Holman et al. | 324/326 |
| 2006/0170584 A1 * | 8/2006 | Romero et al. | 342/22 |
| 2006/0219937 A1 * | 10/2006 | Henry et al. | 250/425 |
| 2006/0255789 A1 * | 11/2006 | Wuersch et al. | 324/67 |
| 2006/0267828 A1 * | 11/2006 | Steinway et al. | 342/22 |
| 2006/0284758 A1 * | 12/2006 | Stilwell et al. | 342/22 |
| 2007/0052612 A1 * | 3/2007 | Trajkovic et al. | 343/840 |
| 2007/0076362 A1 * | 4/2007 | Lagnado | 361/683 |
| 2007/0139248 A1 * | 6/2007 | Baharav et al. | 342/22 |
| 2007/0139249 A1 * | 6/2007 | Baharav et al. | 342/22 |
| 2007/0165384 A1 * | 7/2007 | Vejnar | 361/724 |
| 2008/0111732 A1 * | 5/2008 | Bublitz et al. | 342/179 |
| 2008/0123262 A1 * | 5/2008 | Coleman et al. | 361/680 |
| 2008/0191925 A1 * | 8/2008 | Martin et al. | 342/22 |
| 2008/0246677 A1 * | 10/2008 | Shuster et al. | 343/766 |
| 2008/0291076 A1 * | 11/2008 | Skultety-Betz et al. | 342/22 |
| 2008/0309569 A1 * | 12/2008 | Berejik | 343/761 |
| 2009/0032590 A1 * | 2/2009 | Hopkins | 235/385 |
| 2009/0195435 A1 * | 8/2009 | Kapilevich et al. | 342/22 |
| 2009/0262006 A1 * | 10/2009 | McNeill et al. | 342/22 |
| 2009/0295618 A1 * | 12/2009 | Beeri et al. | 342/22 |
| 2010/0085234 A1 * | 4/2010 | Steinway et al. | 342/22 |
| 2010/0109680 A1 * | 5/2010 | Adams et al. | 324/642 |
| 2010/0117885 A1 * | 5/2010 | Holbrook et al. | 342/22 |
| 2010/0214150 A1 * | 8/2010 | Lovberg et al. | 342/22 |
| 2010/0237300 A1 * | 9/2010 | Robledo | 254/1 |
| 2011/0102234 A1 * | 5/2011 | Adams et al. | 342/22 |
| 2011/0148392 A1 * | 6/2011 | Krapf et al. | 324/67 |
| 2011/0196534 A1 * | 8/2011 | Ekes et al. | 700/259 |
| 2011/0251742 A1 * | 10/2011 | Haas et al. | 701/19 |
| 2011/0261551 A1 * | 10/2011 | Chirila et al. | 361/818 |
| 2012/0268878 A1 * | 10/2012 | Smith | 361/679.08 |
| 2012/0306640 A1 * | 12/2012 | Al-Harbi et al. | 340/539.11 |
| 2013/0082865 A1 * | 4/2013 | Duvoisin et al. | 342/22 |

\* cited by examiner

HAND-HELD SEE-THROUGH-THE-WALL IMAGING AND UNEXPLODED ORDNANCE (UXO) DETECTION SYSTEM

CROSS REFERENCE TO RELATED APPLICATIONS

This application claims the benefit of U.S. Provisional Application No. 61/314,976, filed Mar. 17, 2010, which is incorporated by reference. This application is also related to co-pending U.S. patent application Ser. No. 12/649,268, filed Dec. 29, 2009; U.S. patent application Ser. No. 12/732,163, filed Mar. 25, 2010; U.S. patent application Ser. No. 12/796,635, filed Jun. 8, 2010; and U.S. patent application Ser. No. 12/852,440, filed Aug. 6, 2010, all of which are hereby incorporated by reference.

BACKGROUND

The present disclosure generally relates to radio frequency (RF) detection and ranging (RADAR) and, more particularly, to a portable radar system that can conveniently be held in multiple positions with one hand and that has a tunable beam-forming antenna.

Portable, hand-held radars have been used for detection of hidden objects, e.g., objects such as weapons or explosives hidden behind a wall of a building, concealed on individuals, or otherwise buried or concealed. Such technology holds promise for use in situations where surveillance or security protection is desired—such as for police work, military combat scenarios, or fire and rescue situations. It may be desirable, for example, to be able to detect living individuals, and various objects that may be in their possession using a portable, hand-held radar system from outside a building, for example, occupied by the individuals. An important case of detecting living individuals, and various objects that may be in their possession, is the detection of improvised explosive devices (IED) carried by a person, also referred to as person-borne IED (PBIED). Another important application is detection of unexploded ordnance (UXO) such as abandoned landmines or undetonated bombs. Landmines may generally lie concealed underground, and detection may be facilitated by holding a portable radar system in a first position, e.g., horizontally. In urban environments, unexploded ordnance often may lie concealed behind standing walls, and detection may be facilitated by holding the same portable radar system in a substantially different position, e.g., vertically.

SUMMARY

According to one embodiment, a system includes: a radar unit; an antenna connected to the radar unit, and a reflector for which a distance between the reflector and the antenna is adjustable; and a housing containing the radar unit and the antenna, in which the housing includes: an integral handle projecting from the housing; an auxiliary handle having a first position and a second position and moveable between the two positions; and an external access to a mechanism for adjusting the antenna.

According to another embodiment, a method of housing a portable radar unit includes: providing positioning of an auxiliary handle between a first position and a second position, in which: the first position places the auxiliary handle in a position to act as a handgrip in conjunction with an integral handle; the second position places the auxiliary handle at an angle to the integral handle, in a position to act as a separate handgrip from the integral handle; and rotation of the auxiliary handle about a pivot transits the auxiliary handle between the first position and the second position; and resisting rotation of the auxiliary handle about the pivot using a friction mechanism so that the auxiliary handle tends to stay in a current position until purposefully moved.

According to another embodiment, a method of housing a portable radar unit includes: housing a radar antenna and a reflector inside a housing; housing a mechanism for adjusting a distance between the reflector and the antenna inside the housing; and providing external access without intrusion into the housing for operating the adjusting mechanism.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments and their advantages are best understood by referring to the detailed description that follows. Like reference numerals are used to identify like elements illustrated in one or more of the figures.

DETAILED DESCRIPTION

In accordance with one or more embodiments of the present invention, systems and methods provide for portable radar detection and imaging of concealed or buried objects using a radar unit that is readily held using one hand, leaving an operator's other hand free for additional tasks, and that has an internal antenna that is externally adjustable for tuning the antenna without intrusion into the case housing the antenna and radar unit. One embodiment includes a hand-held ultra wideband (UWB) radio frequency imager that employs a miniaturized, ultra-low power radar system transmitting a signal that penetrates obscuring materials such as cinder block, brick, sheet-rock walls, and soil for objects buried underground, and processing the reflected signal to construct an effective cross-sectional image of the detected objects whether concealed behind obscuring material or buried underground.

Figure 1:
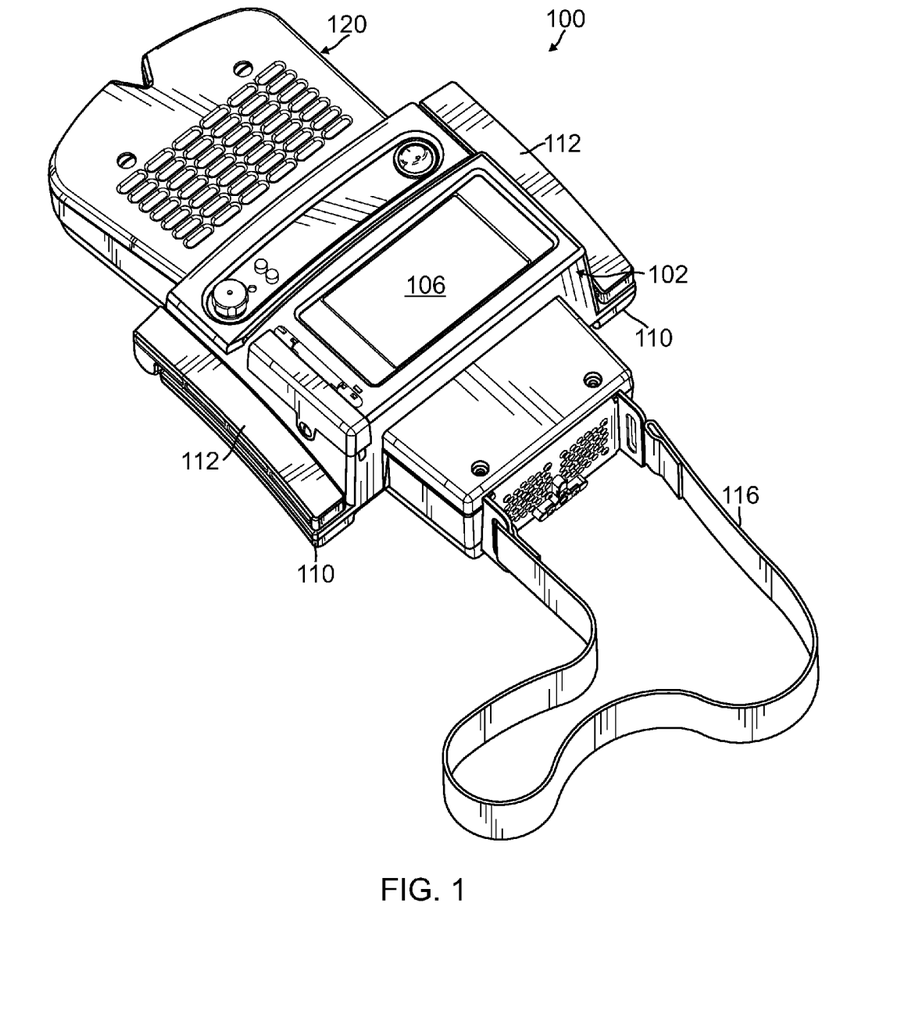
FIG. 1 is a perspective view of a portable radar detection and imaging system showing auxiliary handles in a folded position in accordance with one embodiment.
Figure 2:
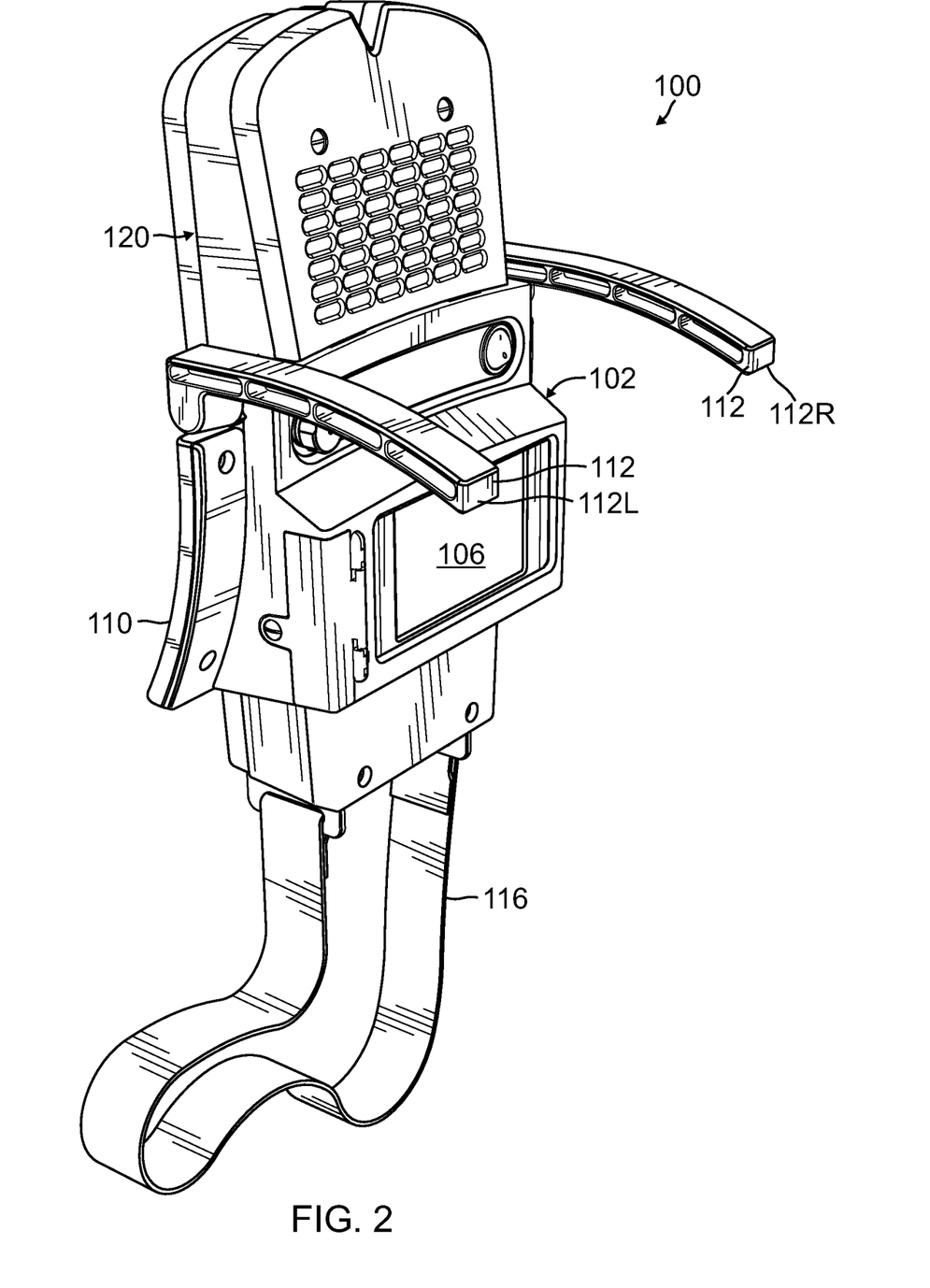
FIG. 2 is a perspective view of a portable radar detection and imaging system showing auxiliary handles in an extended position, and more clearly showing integral handles, in accordance with one embodiment.

One or more embodiments provide a portable, light weight (weighing, e.g., approximately 7 pounds (lb.) or less) radar unit that can be held with one hand and forearm of the same hand against a wall using a pair of lever-like, auxiliary handles to handles that are integral to the housing (see, e.g., FIG. 2). The auxiliary handles can be folded against the integral handles to form a single handgrip on either side of the housing that allows the radar unit to be held with both hands, each auxiliary handle acting in conjunction with an integral handle to provide a single handgrip for one hand (see, e.g., FIG. 1). Thus, the lever-like auxiliary handles may be placed in a folded (horizontal mode, see FIG. 1) position or an extended (vertical mode, see FIG. 2) position. The horizontal mode may allow using both hands to hold the radar unit for scanning an object under ground, for example. The vertical mode may allow placing the radar unit in a more upright position for scanning an object or individual or detecting motion behind a wall or barrier, for example. The vertical mode may allow using only one hand to hold the radar unit, for example, leaving the other hand free for other functions such as programming a computer processor of the radar unit or managing defensive operations. In addition to the horizontal and vertical modes, the auxiliary handles may also be folded or extended independently and may have a friction mechanism that tends to hold the auxiliary handles in any intermediate position, allowing possible additional modes of use depending on the needs and imagination of a user of the radar unit.

In one or more embodiments, the portable, light weight radar unit may include a unique mechanism inside the housing that enables tuning of the internal radar antennas for maximum performance, e.g., fine tuning the beam-forming characteristics of the antennas. The antenna tuning mechanism may allow adjustment of the antenna and reflector of the radar inside the housing from outside the housing without intruding into the housing or opening the housing in any way. For example, a socket head of an adjustment screw may be accessible in a well of the housing surface that places the top of the adjusting screw below a level that is generally flush with most of the housing surface (see, e.g., well 158, shown in FIGS. 4 and 5).

With regard to the radar itself, one or more embodiments, for example, may combine a 5 Giga Hertz (GHz) ultra-wideband (UWB) radar imaging system, a very high frequency, e.g., 60 GHz ultra-wideband radar imaging system, and off-the-shelf optical zooming devices where optical zooming is switchable and the video image is fused to the RF image using 60 GHz radar zooming by applying a very narrow RF beam. Embodiments may be used to identify and differentiate multiple individuals, track the individuals' motion and display the tracking in real time, and identify objects, such as a concealed weapon or PBIED that may be carried by any of the individuals or unexploded ordnance (UXO), e.g., landmines, that may lie buried underground.

Other embodiments of such an ultra-wideband radar imaging system also may be valuable for surveillance to protect an inhabitable area—an office space or living space, for example—with the detection system located inside the space, from individuals behind a building wall and having access to hallways or areas nearby but outside the space. A similar but alternative scenario may be one in which the space under surveillance is protected by a covert detection system hidden from the space, located outside the space behind a wall. An ultra-wideband radar imaging system may also be useful, for example, to persons outside a building (e.g., fire, rescue workers, military, police, or others) requiring surveillance or intelligence data (e.g., detection of living persons and various objects that may be in their possession) regarding individuals occupying the building when entering the building is not practical, permissible, or safe. For an example that has received attention recently, such a system could be useful to rescue workers for locating earthquake victims trapped inside damaged buildings.

FIG. 1 and FIG. 2 illustrate a radar imaging system 100 according to one or more embodiments. Radar imaging system 100 may include a radar detector and imaging unit 102 that may provide raw data from radar scanning to a signal processing and imaging module that may include a computer processor. The ultra-wideband radar detector and imaging unit 102 may send very narrow pulses and perform required signal processing on the response provided by the reflected pulses (also referred to as "scan data") to construct a digitized representation of a target (e.g., an individual to be rescued or an object such as a PBIED or UXO). The radar transmitter of radar unit 102 may emit rapid wideband radar pulses, each pulse of approximately 100-200 pico-second duration. The radar unit 102 of system 100 may, for example, transmit 100 pico-second Gaussian pulses at a 5 GHz or 60 GHz center frequency. The millimeter-wave pulses can penetrate glass, wood, soil, concrete, dry wall, and bricks—with varying attenuation constant, depending on the material. The pulses may be repeated at a chosen pulse repetition frequency (PRF). By choosing a PRF in the range of 1-10 MHz and appropriate average transmitter power, a surveillance range can generally be achieved with a maximum from about 50 feet (ft) to about 500 ft. For example, using the short duration pulses just described, with a PRF at about 10 MHz, surveillance in a range of about 0-50 ft may be accomplished; and with a PRF at about 1 MHz, surveillance in a range of about 450-500 ft may be accomplished.

Radar unit 102 may, for example, incorporate a 5 GHz center-frequency radar unit that may include an ultra-wideband, high-performance, portable radio-frequency imaging module which enables detection of solid items or liquid layers placed behind a wall or otherwise concealed, whether stationary or in a state of motion. For example, three versions of the module may be based on the same core hardware and software framework: 1) an underground motion detection sensor system; 2) a mountable sensor cluster system; and 3) a portable hand-held unit. In each version, the module's scanner transmits sub-nanosecond pulses that can penetrate and be reflected in the ground, concrete, wood, or other solid or liquid items for "sensing" them. The low-power module may utilize pulses in the license free 3 to 8 GHz band with 5 GHz bandwidth compliant with the FCC power spectrum. Depending on the width and depth of the item being scanned, the pulses can penetrate up to 120 ft in air for slightest movement detection using a single pair of antennas and low power mode. The module's pulse detector receives the "bounce-back" signals from the transmitter and builds the image of the reflections for classification based on the size of an object. The module may have multiple options for field of view (FOV), for example, a 140 degrees FOV and a 30 degrees FOV for more focused scanning of a target.

Radar unit 102 according to another embodiment, for example, may include a 60 GHz center frequency radar unit that may operate at a 60 GHz unlicensed band, e.g., V band, with 57 GHz to 64 GHz bandwidth. A 60 GHz center-frequency radar operating with an ultra-wideband 7 GHz bandwidth may provide for a very fine resolution imaging radar as an enhanced version of a 5 GHz center frequency ultra-wideband radar that provides a ten-times enhancement in millimeter wave radio frequency imaging resolution of concealed material such as IEDs. In one embodiment, a 60 GHz center-frequency ultra-wideband radar may combine significant depth resolution enhancement with a miniaturized antenna array (e.g., antenna 104, see FIGS. 4, and 5) that produces a very narrow beam width, providing improved lateral resolution for producing RF images of the scanned material.

An array of dipole, patch, or spiral antennas (e.g., antennas 104) may be employed to enhance antenna directionality and enable beam forming For example, radar unit 102 may achieve a range resolution of about 2 mm Using an integrated antenna module with a large number, e.g., 1024, of antenna elements, radar unit 102 may achieve a beam width less than about 2 degrees. In the receiver of each radar unit 102, a correlator pulse detector circuit may be employed to identify reflections of the pulses. Amplitude and delay information may be extracted and processed in an integrated signal processor, which may be included, for example, in the signal processing and imaging module of radar unit 102. Image construction algorithms may be implemented using digital signal processing (DSP) and may yield a two-dimensional (2D) or three-dimensional (3D) image on a display screen 106 of individuals and objects subjected to surveillance using radar unit 102.

Continuing with FIG. 1 and FIG. 2, radar system 100 may include handles 110 which may be formed integral to housing 120. System 100 may include auxiliary handles 112 that may be folded up against integral handles 110 so that each may act in conjunction with a handle 110 as a single grip or handle, e.g., in a horizontal mode as described above and illustrated in FIG. 1. Auxiliary handles 112 may be rotated from the folded position shown in FIG. 1 to an extended position so that each may act separately from its corresponding handle 110 as a second grip or handle in addition to handles 110, e.g., in a vertical mode as described above and illustrated in FIG. 2. The pair of auxiliary handles 112 may resemble two curved levers that can be placed in horizontal mode position (e.g., as seen in FIG. 1) in a recessed location, or can be smoothly raised to be placed in a vertical mode position, e.g., as seen in FIG. 2. The auxiliary handles 112 may be added to a housing 120 that has already been designed to have integral handles 110. The auxiliary handles 112 may allow easier operation of radar unit 102 against vertical surfaces—such as walls. Auxiliary handles 112 may fold flat and may functionally form the upper half of the handles (e.g., in combination with handles 110 that are an integral part of the plastic housing 120) when the radar unit 102 is used in horizontal mode (e.g., being held with two hands, or being held with the auxiliary handles 112 folded, as seen in FIG. 1).

Each auxiliary handle 112 may be operated independently of the other; each may have a first position that places the auxiliary handle 112 close alongside an integral handle 110 (the corresponding handle 110 on the same side of the housing 120); and each may have a second position that places the auxiliary handle 112 at an angle (e.g., 90 degrees as shown between FIGS. 1 and 2, and other angles may be chosen by design) to the integral handle 110 that effectively separates the auxiliary handle 112 and the corresponding integral handle 110 relative to a hand grip. As seen in FIGS. 1 and 2, the handles may be arranged symmetrically so that, in the second (e.g., vertical mode) position, the radar unit 102 may become configured to be supported by a hand grip of one auxiliary handle while being supported under the other auxiliary handle by a forearm of the same hand. For example, and referring to FIG. 2, a right handed user may grip the rightmost auxiliary handle 112R with the left hand while placing the leftmost auxiliary handle 112L over the left forearm (i.e., forearm of the same hand used to grip radar unit 102) leaving the user's right hand free to perform tasks other than holding on to radar unit 102. The symmetrical arrangement may allow a user to similarly hold radar unit 102 with the right hand and forearm, leaving the left hand free. Radar system 100, e.g., radar unit 102, may also include a strap 116 that can be used for carrying radar unit 102, for example, or for providing security against accidentally dropping radar unit 102.

Figure 3:
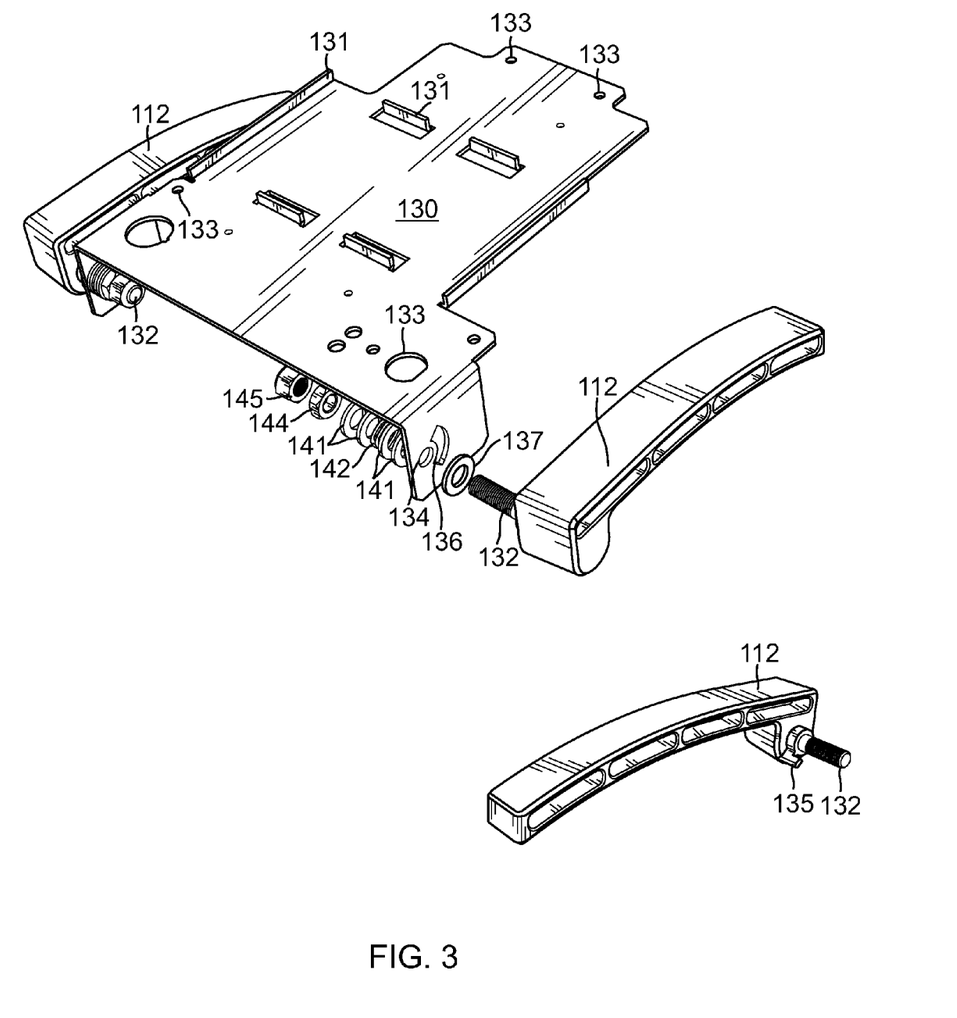
FIG. 3 is a detailed view of a mechanism for supporting auxiliary handles of the radar system of FIGS. 1 and 2 in accordance with one embodiment.

FIG. 3 shows a chassis 130 for holding the auxiliary handles 112 securely to the radar unit 102, e.g., for transmitting mechanical forces between the auxiliary handles 112 and the housing 120. FIG. 3 also shows details of a friction mechanism for, e.g., keeping the handles in whatever position the auxiliary handles are left in or preventing unwanted movement of the auxiliary handles 112.

Chassis 130 may include tabs, such as tabs 131, which may serve to locate internal components, such as electronics, within the enclosure. Chassis 130 may include holes, such as holes 133, for securing chassis 130 to housing 120—e.g. by installing fasteners such as screws, rivets, or integrally molded snaps of the housing 120 through the holes 133. Thus, a mechanical force that supports auxiliary handles 112 may be transmitted through the chassis 130 to housing 120 to support the radar unit 102 and radar system 100. A mechanical force that supports the auxiliary handles 112 may be transmitted through a handle stud 132 to the chassis 130 by way of the handle stud 132 being located in a pivot hole 134. Thus, auxiliary handles 112 may be rotated about handle stud 132, used as a pivot, between the folded and extended positions described above. Handle stud 132 may be attached to or integrally formed with auxiliary handle 112. A travel limiting tab 135 may be attached to or integrally formed with auxiliary handle 112. Travel limiting tab 135 may interact with travel limiting slot 136, for example, to prevent rotation of auxiliary handle 112 beyond the first (e.g. folded) position or to prevent rotation of auxiliary handle 112 beyond the second (e.g. extended) position, or both. Ninety degrees, for example, of rotational travel may be allowed between the folded and extended positions by the travel limiting tab 135 and travel limiting slot 136. A bearing washer 137 may be provided between auxiliary handle 112 and chassis 130 as shown in FIG. 3, and may support axial loads between auxiliary handle 112 and chassis 130.

A friction mechanism may be formed, as shown in FIG. 3, by stacking flat washers 141 and spring washers 142 along the pivot formed by handle stud 132. Spring washers 142 may provide a constant axial load once compressed by jam nut 144 during assembly. A lock nut 145 may be tightened against the jam nut 144 during assembly to prevent the jam nut from loosening during operation (e.g., rotation back and forth and supporting of radar unit 102) of the auxiliary handle 112. The friction mechanism may resist rotation of auxiliary handles 112 until purposefully moved, e.g., rotated by a user of radar system 100, yet may allow free movement of auxiliary handles 112 without a need for use of latches or catches. Compression of spring washers 142 may provide a constant axial load on the pivot (e.g., handle stud 132) between the auxiliary handle 112 and the chassis 130, pushing flat washers 141 together so that friction is provided against rotation of auxiliary handle 112 even as the mechanism wears during use.

The auxiliary handles 112 with their rotational folding and friction mechanism may be durable, relatively compact, and low cost. Auxiliary handles 112 may be aluminum for a combination of strength and light weight, and the fastening hardware may be stainless steel for corrosion resistance. No latch or catch need be used, and the handles 112 can be independently positioned simply by rotating them. The friction inherent in the mechanism may keep the handles 112 in whatever position they are left in, and a travel limiting stop (e.g., end or ends of travel limiting slot 136) may insure that their maximum rotation is to the vertical mode position. In this position, the user may grasp one auxiliary handle, and place the other over the forearm of the same arm to support the radar unit 102.

Figure 4:
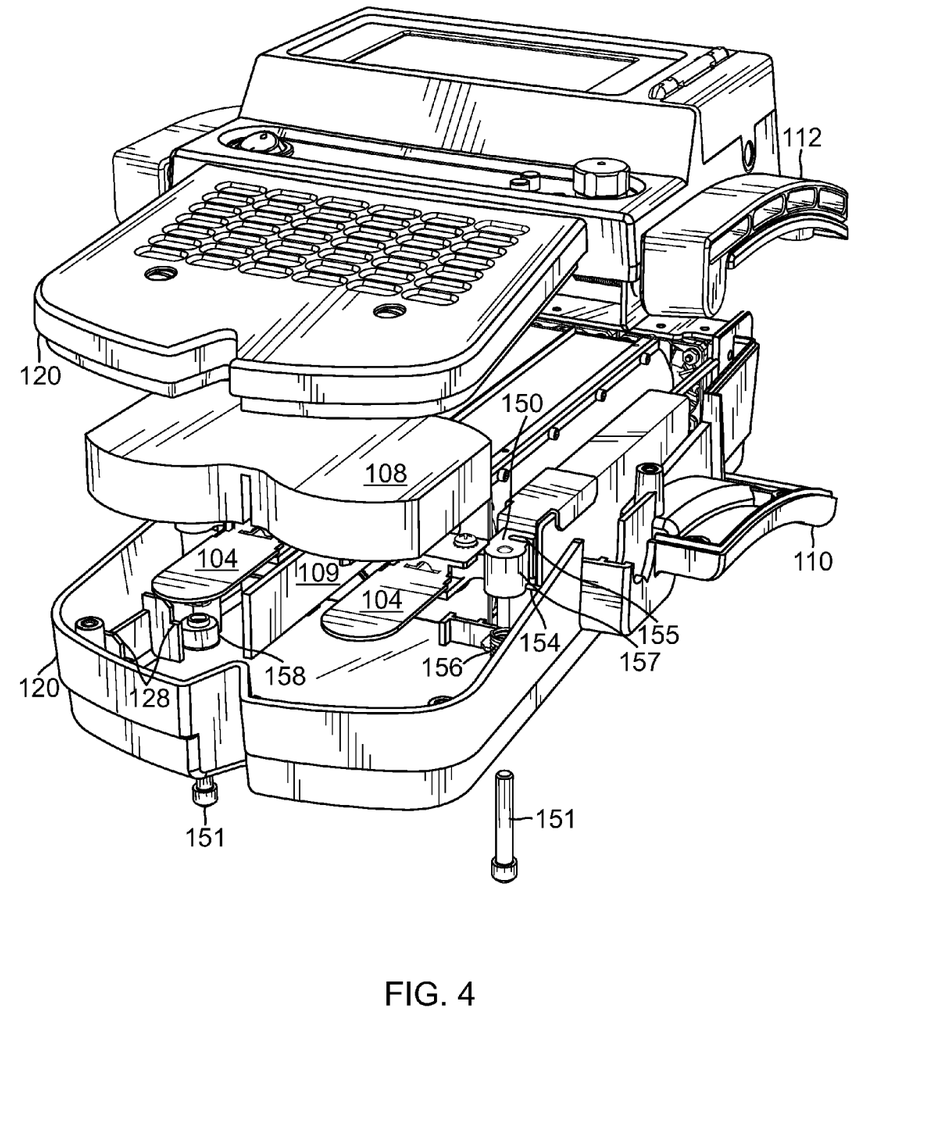
FIG. 4 is an exploded view of the radar system of FIGS. 1 and 2 in accordance with one embodiment.
Figure 5:
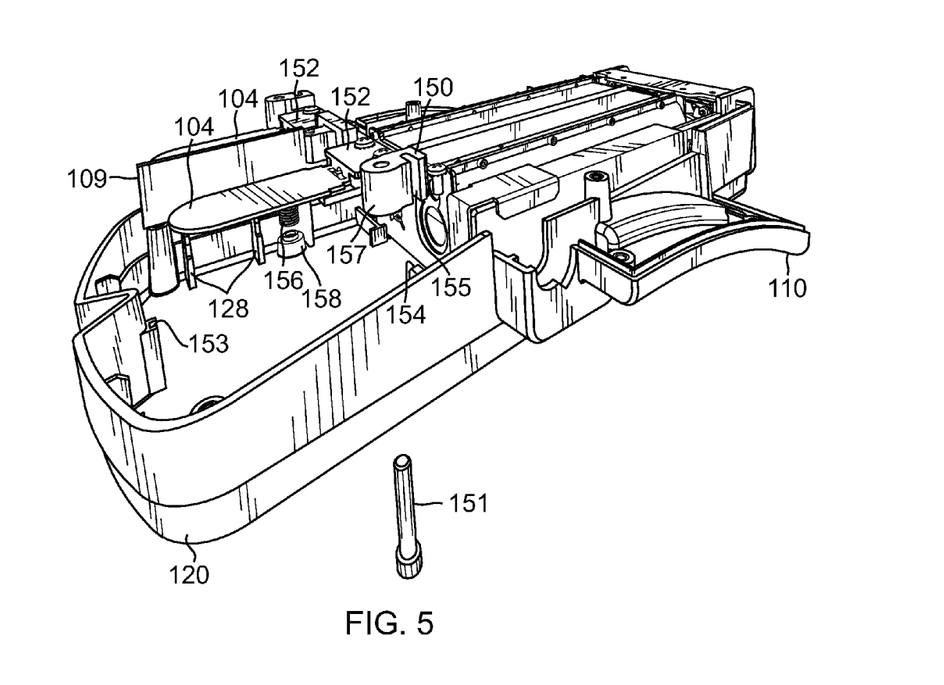
FIG. 5 is an exploded view from another perspective of the radar system of FIGS. 1 and 2 in accordance with one embodiment.

FIGS. 4 and 5 illustrate further details of housing 120 of radar system 100 and radar unit 102, in particular relating to antennas 104, antenna reflector 108, and adjustment of the relative position between the antennas 104 and antenna reflector 108. Adjustment of the relative position of antennas 104 and antenna reflector 108 may be made, for example, to tune the UWB radar antennas 104 for their maximum performance and to focus or adjust the beam forming characteristics of the antennas 104. An antenna adjustment mechanism including a pair of externally accessible screws 151 may allow a vertical (relative to the horizontal orientation of housing 120 shown in FIGS. 4 and 5) adjustment to the position of planar array antennas 104 to move reflector 108 closer to them or increase separation of reflector 108 from the planar array antennas 104. A unique feature may be external control of the adjustment mechanism which is non-intrusive with regard to the housing 120. Thus, final antenna tuning and adjustments may be made after final assembly of the radar unit 102 without either opening or penetrating the housing 120 in any way, which could, for example, introduce dust, water, or other foreign object debris (FOD) into the housing 120.

The antenna-reflector adjustment mechanism may allow the distance between the antennas 104 and the reflector 108 to be varied, from the exterior of the radar unit 102, to allow final focusing of the beam with intruding into or opening the housing 102. Due to miniaturization of the radar unit 102 and compact size of housing 120, there may be little space available for an adjustment mechanism, requiring a simple mechanism. Moving the large reflector 108 may be infeasible because its weight and size may make it difficult to move with a simple mechanism. By making the reflector 108 fixed relative to the housing 102 and moving the antennas 104, a breakthrough may be achieved because the antennas 104 are much lighter so that a simple mechanism including a carrier 150, to which the antennas 104 attach, may be provided that fits in the space available inside the housing.

The lightweight, compact mechanism, including the carrier 150, may allow the antenna assembly (e.g., carrier 150 with antennas 104 attached) to be installed during final assembly without the reflector 108 in place. Then during final assembly the reflector 108 may be captured and held between the upper and lower portions of housing 120 at final assembly without the need for fasteners. For example, reflector 108 may be captured between locators 128 that are shaped, sized, and positioned to contact reflector 108 and hold reflector 108 securely in a fixed position relative to the housing 120 when the upper and lower housing portions are closed together at final assembly of radar unit 102. Reflector 108 may be made of aluminum, for example, for its electrical properties. Plastic may be used for many of the components—such as upper and lower portions of the housing 120 and the carrier 150—to make them lighter and less costly.

An isolator 109 may be situated between the two antennas 104 and may move with the antennas 104 in relation to the reflector 108 while keeping a fixed relationship to the antennas 104. The isolator 109 may provide electrical isolation of the antennas 104 from each other and may act in conjunction with the two chambers of reflector 108 for providing electrical isolation of the antennas 104 from each other. Thus, due to relative changes in position between antennas 104 and reflector 108 when making antenna adjustments, isolator 109 may be sized and disposed to overlap reflector 108 as seen from antennas 104, and to move, relative to reflector 108, in a slot between the two "halves", or chambers, of reflector 108, as may be seen in FIGS. 4 and 5.

As shown most clearly in FIGS. 4 and 5, antennas 104 and isolator 109 may be secured to carrier 150, which is moveable with respect to housing 120 and which generally spans the interior of housing 120 as shown. For example, blocks 152 may be used to secure antennas 104 to carrier 150 using screws to attach blocks 152 to carrier 150, trapping and securing a portion of antennas 104 between the blocks 152 and carrier 150. Similarly, a portion of isolator 109 may be trapped in a notch of carrier 150 (see FIG. 5) and secured or attached by screws, for example. A guide channel 153 (see FIG. 5) may be provided for one end of isolator 109 to slide up and down in. Guide ribs 154 (see FIGS. 4 and 5) may be formed integrally to the housing 120 for engaging a guide channel 155 (see FIGS. 4 and 5) in the carrier 150. The guide channels 155 may be disposed to slide along the guide ribs 154 of the housing 120 so that the carrier 150 is located by the two vertical guide ribs 154 of the housing, allowing vertical movement of the carrier 150 but restricting its movement in other directions. It may be obvious that, alternatively, a guide channel could be provided in the housing 120 and a corresponding, mating guide rib could be provided on the carrier 150.

Vertical movement, e.g., positioning, of the carrier 150 may be controlled by the two adjustment screws 151, which pass through coil springs 156 and thread into carrier 150. Carrier 150 may include receptacles 157 for receiving and securely holding the springs 156. Springs 156 may apply constant upward pressure on the carrier 150 while the screws 151 resist that pressure thereby fixing the antenna's 104 vertical position with respect to the housing 120. The vertical position of antennas 104 may be adjusted from outside the housing 120 of radar unit 102 by turning the adjustment screws 151. Heads of the adjustment screws 151 may be recessed in wells 158 that keep the heads of the screws 151 below a level that is flush with rest of the surface of housing 120 so that only the screws 151 themselves pass through the housing 120 to the interior of the housing 120 and no opening of or intrusion into the housing 120 is required for operating the adjustment screws 151 to adjust the position of reflector 108 relative to antennas 104.

Embodiments described herein illustrate but do not limit the disclosure. It should also be understood that numerous modifications and variations are possible in accordance with the principles of the present disclosure. Accordingly, the scope of the disclosure is best defined only by the following claims.

We claim:

1. A system comprising:
   a radar unit;
   an antenna connected to the radar unit;
   a reflector wherein a distance between the reflector and the antenna is adjustable; and
   a housing containing the radar unit and the antenna and the reflector, the housing comprising:
     an integral handle projecting from the housing;
     an auxiliary handle having a first position and a second position and moveable between the two positions wherein the first position places the auxiliary handle close alongside the integral handle to act in conjunction with the integral handle as a single handgrip for one hand; and
     an external access to a mechanism inside the housing for adjusting the distance between the reflector and the antenna, both inside the housing, without opening the housing or inserting a tool through the housing.

2. The system of claim 1, wherein:
the auxiliary handle is attached to a pivot so that movement between the first position and the second position is accomplished by a rotation of the auxiliary handle; and
the second position places the auxiliary handle at an angle to the integral handle that effectively separates the auxiliary handle and the integral handle so that the auxiliary handle acts separately as a second handgrip in addition to the integral handle.

3. The system of claim 1, wherein:
the mechanism includes a screw disposed so that contact with the screw operational to rotate the screw is externally accessible without intrusion into the housing;
the screw threads into a carrier internal to the housing; and
rotation of the screw moves the carrier.

4. The system of claim 1, further comprising:
a chassis configured to transmit forces between the auxiliary handle and the housing, wherein the auxiliary handle is attached to a pivot so that movement between the first position and the second position is accomplished by a rotation of the auxiliary handle; and
a means for providing a constant axial load on the pivot between the auxiliary handle and the chassis so that friction is provided against the rotation regardless of wear.

5. The system of clam 1, further comprising:
an antenna carrier internal to the housing, including:
  a guide channel disposed to slide along a guide rib of the housing;
  a hole with an internal screw thread sized to operate with an adjustment screw accessible for operation from outside the housing;
  a receptacle for a spring providing pressure on the carrier resisted by the adjustment screw;
  a support for the antenna; and
  a support for an antenna isolator.

6. The system of claim 1, further comprising:
a second integral handle on the housing;
a second auxiliary handle having a first position and a second position, wherein:
the first position places the auxiliary handles close alongside the integral handles to form a single handgrip on either side of the housing for holding the radar unit with two hands;
the second position places the auxiliary handles at an angle to the integral handles that effectively separates the auxiliary handles and the integral handles so that each auxiliary handle acts separately from its corresponding integral handle to form a second grip in addition to a first grip provided by the integral handles; and
the auxiliary handles and integral handles are arranged symmetrically so that, in the second position, the radar unit is configured to be supported by a user's grip on one auxiliary handle while being supported under the other auxiliary handle by a forearm of the same hand of the user.

7. A system comprising:
a radar unit;
an antenna connected to the radar unit;
a reflector wherein a distance between the reflector and the antenna is adjustable; and
a housing containing the radar unit, the antenna, and the reflector, the housing comprising:
  an integral handle projecting from the housing; and
  an auxiliary handle having a first position and a second position and moveable between the two positions wherein the first position places the auxiliary handle close alongside the integral handle to act in conjunction with the integral handle as a single handgrip for one hand.

8. The system of claim 7, wherein:
the auxiliary handle is attached to a pivot so that movement between the first position and the second position is accomplished by a rotation of the auxiliary handle; and
the second position places the auxiliary handle at an angle to the integral handle that effectively separates the auxiliary handle and the integral handle so that the auxiliary handle acts separately as a second handgrip in addition to the integral handle.

9. The system of claim 7, further comprising:
a chassis configured to transmit forces between the auxiliary handle and the housing, wherein the auxiliary handle is attached to a pivot so that movement between the first position and the second position is accomplished by a rotation of the auxiliary handle; and
a means for providing a constant axial load on the pivot between the auxiliary handle and the chassis so that friction is provided against the rotation regardless of wear.

10. The system of claim 7, further comprising:
a second integral handle on the housing;
a second auxiliary handle having a first position and a second position, wherein:
the first position places the auxiliary handles close alongside the integral handles to form a single handgrip on either side of the housing for holding the radar unit with two hands;
the second position places the auxiliary handles at an angle to the integral handles that effectively separates the auxiliary handles and the integral handles so that each auxiliary handle acts separately from its corresponding integral handle to form a second grip in addition to a first grip provided by the integral handles; and
the auxiliary handles and integral handles are arranged symmetrically so that, in the second position, the radar unit is configured to be supported by a user's grip on one auxiliary handle while being supported under the other auxiliary handle by a forearm of the same hand of the user.

11. A system comprising:
a radar unit;
an antenna connected to the radar unit;
a reflector wherein a distance between the reflector and the antenna is adjustable; and
a housing containing the radar unit, the antenna, and the reflector, the housing comprising:
  an external access to a mechanism inside the housing for adjusting the distance between the reflector and the antenna, both inside the housing, without opening the housing or inserting a tool through the housing.

12. The system of claim 11, wherein:
the mechanism includes a screw disposed so that contact with the screw operational to rotate the screw is externally accessible without intrusion into the housing;
the screw threads into a carrier internal to the housing; and
rotation of the screw moves the carrier.

13. The system of clam 11, further comprising:
an antenna carrier internal to the housing, including:
  a guide channel disposed to slide along a guide rib of the housing;
  a hole with an internal screw thread sized to operate with an adjustment screw accessible for operation from outside the housing;

a receptacle for a spring providing pressure on the carrier resisted by the adjustment screw;
a support for the antenna; and
a support for an antenna isolator.

* * * * *